Patented Oct. 25, 1932

1,884,558

UNITED STATES PATENT OFFICE

WILLIAM S. CALCOTT, OF PENNS GROVE, NEW JERSEY, AND HARRY H. REYNOLDS, OF WILMINGTON, DELAWARE, ASSIGNORS TO E. I. DU PONT DE NEMOURS & COMPANY, OF WILMINGTON, DELAWARE, A CORPORATION OF DELAWARE

PULVERULENT PHOSPHORUS PENTOXIDE

No Drawing.   Application filed August 22, 1929.   Serial No. 387,786.

This invention relates to phosphorus pentoxide as a dehydrating agent, and specifically phosphorus pentoxide which does not form a gummy solution when thorough moistened.

Phosphorus pentoxide is well known to be a powerful dehydrating agent, but the rapid formation of a gummy solution of a phosphorus pentoxide in metaphosphoric acid when water is absorbed prevents the successful use of the pentoxide in drying towers and desiccators. This invention has for an object the treatment of phosphorus pentoxide so as to obtain it in a form in which it may be successfully used as a dehydrating agent. Other objects will appear as this description proceeds.

This object is accomplished by the following invention:

We have found that when phosphorus pentoxide is mixed with charcoal the resulting mixture may be brought into active contact with water without materially altering the initial pulverulence of the mixture. Purely by way of illustration, since it is to be understood that we do not wish to be limited to the particular proportions or particular charcoal specified, we offer the following examples:

Example 1

120 parts of a mixture containing 50% of activated charcoal was placed in a dessicator containing 3.8 parts of water in a suitable receptacle. The quantity of water used corresponded to half the amount required by theory to react with 60 parts of phosphorus pentoxide to form metaphosphoric acid. After the water had been completely absorbed, the mixture was found to possess essentially the same degree of pulverulence which it initially possessed.

Example 2

100 grams of a mixture containing half phosphorus pentoxide by weight and half activated charcoal were suspended in 1 liter of moist liquid sulphur dioxide. Upon removal of the liquid by distillation, the residual mixture was found to possess its initial degree of pulverulence and the sulphur dioxide was found to be thoroughly dry.

Example 3

100 grams of a mixture containing approximately equal parts of phosphorus pentoxide and activated charcoal were placed in a glass tube and a current of moist gaseous sulphur dioxide was passed horizontally over the mixture for several hours. At the end of this time the mixture contained no gummy material and the sulphur dioxide had been thoroughly dried.

It will, of course, be obvious that the proportions of phosphorus pentoxide and charcoal may be varied within fairly wide limits. Sufficient charcoal must be present, however, to separate the particles of phosphorus pentoxide to such an extent as to prevent the formation of the usual gummy solution.

As many apparently widely different embodiments of this invention may be made without departing from the spirit thereof, it is to be understood that we do not limit ourselves to the foregoing examples or descriptions except as indicated in the following patent claims.

We claim:

1. A non-gumming dehydrating agent consisting of a pulverulent mixture of phosphorus pentoxide and charcoal.

2. A non-gumming dehydrating agent consisting of a pulverulent mixture of phosphorus pentoxide and activated charcoal.

3. A dehydrating agent consisting of a pulverulent mixture of substantially equal parts of phosphorus pentoxide and charcoal.

In testimony whereof we affix our signatures.

WILLIAM S. CALCOTT.
HARRY H. REYNOLDS.